US008907789B2

(12) United States Patent
Kochan, Jr. et al.

(10) Patent No.: US 8,907,789 B2
(45) Date of Patent: Dec. 9, 2014

(54) PUMP CONTROL UNIT

(75) Inventors: John R. Kochan, Jr., Naperville, IL (US); Casey W. Barker, Plainfield, IL (US); Anton Belehradek, Woodridge, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 674 days.

(21) Appl. No.: 12/775,525

(22) Filed: May 7, 2010

(65) Prior Publication Data

US 2011/0273288 A1 Nov. 10, 2011

(51) Int. Cl.
*G08B 21/00* (2006.01)
*F04B 49/06* (2006.01)
*F04B 41/06* (2006.01)
*F04B 49/08* (2006.01)
*G05D 9/12* (2006.01)

(52) U.S. Cl.
CPC .............. *F04B 49/065* (2013.01); *F04B 41/06* (2013.01); *F04B 49/08* (2013.01); *G05D 9/12* (2013.01); *F04B 2205/03* (2013.01)
USPC ........ 340/540; 417/1; 417/4; 417/26; 417/45; 417/44.1; 417/44.2; 417/44.5

(58) Field of Classification Search
CPC .......... C02F 1/441; G08B 3/10; G08B 25/14; G08B 13/1672
USPC ......................................................... 340/540
See application file for complete search history.

(56) References Cited

U.S. PATENT DOCUMENTS

| 2,275,066 | A  | * | 3/1942  | Otterbourg ..................... 417/12 |
| 3,572,319 | A  | * | 3/1971  | Bittner et al. ................. 600/398 |
| 7,246,662 | B2 | * | 7/2007  | Jabusch et al. ............ 166/250.15 |
| 2007/0240903 | A1 | * | 10/2007 | Alft et al. ........................ 175/50 |
| 2008/0077020 | A1 | * | 3/2008  | Young et al. .................. 600/484 |
| 2010/0193052 | A1 | * | 8/2010  | Watkins .................... 137/565.01 |
| 2010/0258088 | A1 | * | 10/2010 | Harrison et al. ............. 123/478 |
| 2012/0090341 | A1 | * | 4/2012  | Hatada et al. ............... 62/238.7 |

* cited by examiner

*Primary Examiner* — George Bugg
*Assistant Examiner* — Anthony D Afrifa-Kyei
(74) *Attorney, Agent, or Firm* — Husch Blackwell LLP

(57) ABSTRACT

A pump control system includes a controller coupled to first and second pressure sensors. The sensors couple serial pressure related information to the controller. The controller can evaluate respective liquid levels, in response to received pressure related information from the sensors. A current sensor coupled to the controller can provide signals indicative of operation of one or more pumps coupled to the controller. The controller includes circuits to detect the presence of predetermined faults and to emit an audible fault indicator in response thereto.

19 Claims, 3 Drawing Sheets

PUMP CONTROL UNIT

FIELD

The invention pertains to multiple pump control units. More particularly, the invention pertains to computer based control units which can control multiple pumps in response to sensed liquid levels.

BACKGROUND

Various types of sump pump control units are known. Many of these units are intended to work with float switches. While useful, such switches are known to have limited lifetimes in part due to pump motor turn on/turn off currents, and are inconvenient when liquid on-off levels are being set.

DETAILED DESCRIPTION

Figure 1:
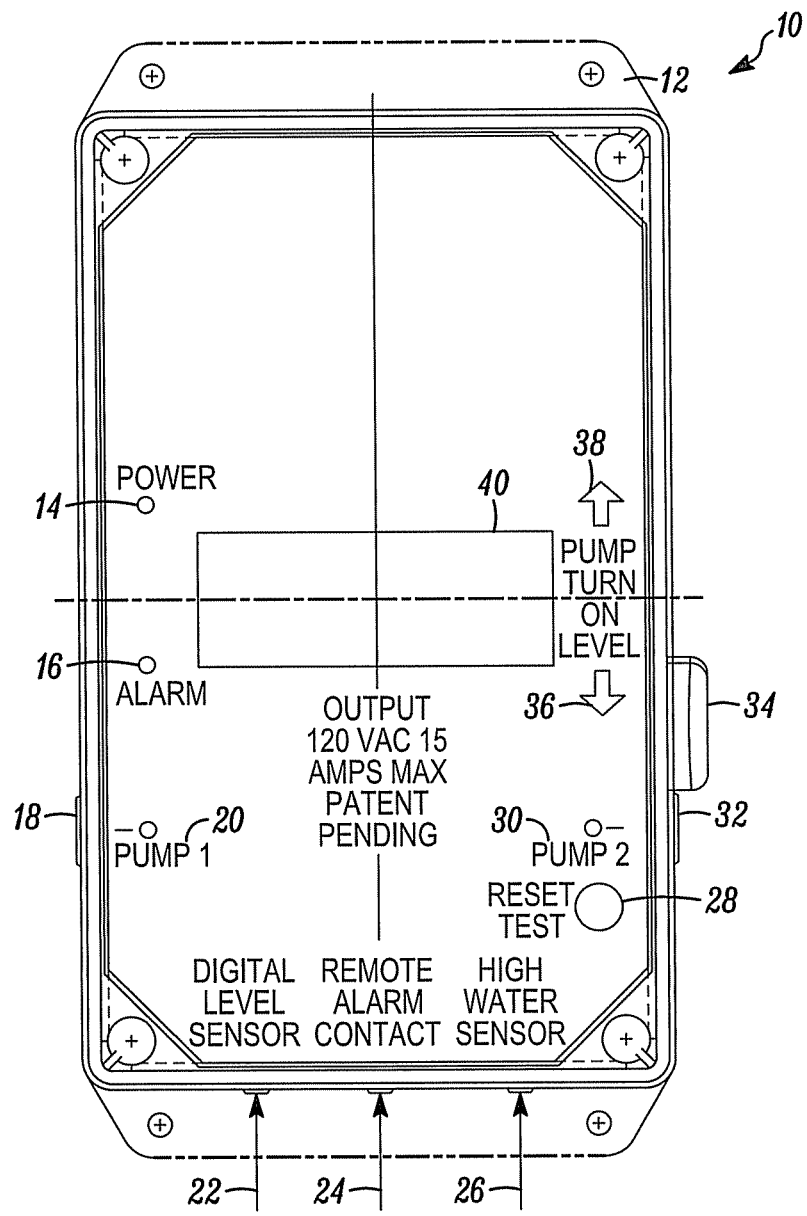
FIG. 1 is an over-all diagram of one embodiment of the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In one aspect of the invention, a microprocessor controlled residential simplex or duplex pump controller utilizes digital water level sensors. When paired with either one sump pump or two sump pumps, the controller accurately monitors the water levels within the sump pit or similar environment and activates the appropriate pump accordingly.

A plurality of pumps can be operated individually, operating one at a time, from a single residential wiring circuit. This creates pumping redundancy should one of the pumps happen to fail to operate and simplifies the installation by eliminating the necessity for an additional branch circuit feeder for the second pump.

In another aspect of the invention, a main controller unit is coupled to two digital level sensors. Two push button switches on a cover of a housing allow the user to adjust and set the pump(s) turn on level. By incorporating this feature, the user can adjust the level at which the pump will activate without having to change the height of the digital level sensor, as in the case of traditional float switches. This feature also allows the unit to be used effectively in small volume sump pits as well as large volume sump pits. Sump pumps can now be efficiently cycled within their working environment by effortlessly selecting the appropriate pump turn on height. By minimizing the actual number of pump turn on cycles the life expectancy of the pump(s) can be further maximized and energy conserved.

The controller accurately determines the height of the water within a given sump application, based on information acquired from the two digital level sensors. The digital level sensors accurately measure the height of the water within the sump pit and digitally communicate those values to the host controller by means of a serial communications protocol transmitted via a serial communications link.

A separate microprocessor within the digital float sensors samples analog data from a strain gauge which electro-mechanically converts the water pressure to an electrical resistance. Because water pressure is directly proportional to the water height, the electrical resistance of the strain gauge is also proportional to the water height. The resistance of the strain gauge is measured by means of a resistive bridge network and is further amplified and conditioned by an operational amplifier network before passing into the microprocessors analog to digital converter input.

Within the microprocessor, the analog voltage value, which is proportional to the water level, is converted to a numerical (binary) value which is subsequently scaled to produce a water level to binary ratio of 0.1 inches of height per single bit of accuracy. An 8 bit value of xFF, or 255 base 10, would indicate a water level of 25.5 inches. Similarly, an 8 bit value of x00, or 0 base 10, would indicate a water level of 0.00 inches By allowing the water level sensing to be performed digitally within each float sensor, the unit can use a hardware differential signaling communications method to robustly and accurately transfer the digital water height information from the level sensors to the host processor. This provides for an accurate measurement of the water level in the presence of radiated electrical noise, which is often inherent in AC (alternating current) motor applications. Electrical noise is most commonly generated during motor turn on and turn off events.

The digital level sensors communicate water levels to the host controller digitally by means of a software driven serial communications link. This software feature, encoded within every digital level sensor and the host microprocessor allows for robust data delivery by means of cyclical redundancy checks as well as timer based fault exceptions. This method can be used to communicate water height data, as well as internal sensor status data, to the host controller accurately.

Traditionally, sump pumps have often been started by means of a mechanical switch. The mechanical switch design often uses a set of electrical contacts which close under a given water height scenario, thereby activating the sump pump. Due to the alternating nature of the electrical voltage source from the utility, large voltage differentials could possibly be present across the mechanical switch contacts prior to turning on a pump. When a pump is suddenly turned on under these conditions, large transient current surges could be expected as the motor begins to rotate. These transient surges often cause heating of the electrical contacts which, over time, effectively reduce the life time of the switch. This condition is further amplified when a mechanical switch attempts to open and turn off the pump.

As is well known, electrical motors are largely inductive in nature. The nature of an inductor is to resist sudden changes in current by means of its induced magnetic field. When an inductor circuit which was passing current is suddenly opened, its magnetic field attempts to maintain the current flow before gradually diminishing. As this occurs, a voltage is generated across the inductor which is directly proportional to the time varying change of current through it. This voltage can be described by the equation $V_L = L di/dt$ (Eq. 1). This formula states the voltage induced across an inductor is proportional to the inductance of the inductor times the time rate of change of the inductor current.

When a mechanical switch suddenly opens an inductive motor load, the time rate of change of the current flow can be very large. This value, multiplied by the motors internal inductance, induces a large voltage transient across the mechanical switch contacts. This transient often causes arcing of the contacts which, over time, can cause the switch to wear and ultimately fail. It is well known in the sump pump industry that the cause of most pumping failures occurs when the pumps switch fails.

Embodiments of the invention effectively eliminate the problem of switching transients and contact arcing by incorporating both a solid state switching device in parallel with an electrical relay. When a pump is called for, the turn on cycle begins by enabling the solid state device, or triac. The nature of the triac in our design is to switch on a load under low voltage conditions. By starting the pump motor from a low voltage potential, both radiated and conducted electrical noise have been dramatically reduced.

Further, the absence of electrical contacts during the starting of the motor phase reduces the probability of switch failure over an extended period of time. To reduce heat and power dissipation in the triac after a pump has started, a relay is activated whose contacts close across the switching contacts of the triac. Because the voltage potential across the triac is very low when it is enabled, the relay contacts also close across a low voltage potential thereby reducing the probability of arcing and extending the life of the relay. When used in this manner, the triac/relay time delayed switching method provides a very reliable and effective means for enabling a sump pump and increasing pumping operations.

Additional benefits to this switching method are seen when attempting to turn off a sump pump. At the beginning the turn off sequence, the relay is turned off first and its contacts are opened. As the relays contacts begin to open, they open across the triacs switching contacts which are still at a very low impedance and voltage. Pump current is instantly diverted through the triac, allowing for an arc free power transition in the relay. This, again, allows for very low electrical noise generation and extends the life of the relay contacts increasing overall pump operations.

After a predetermined amount of time, the triac is also disabled. Given the electrical nature of this device, the current passing through it is terminated at a value approaching zero amps. If we look again at Eq. 1 above, and substitute 0 in for the di term, we get a resulting $V_L$ of zero volts. This means that the probability of an excessive voltage spike across the switching components is greatly reduced at pump turn off reducing the probability of electrical noise and increasing the reliability and longevity of the pump system.

Figure 2:
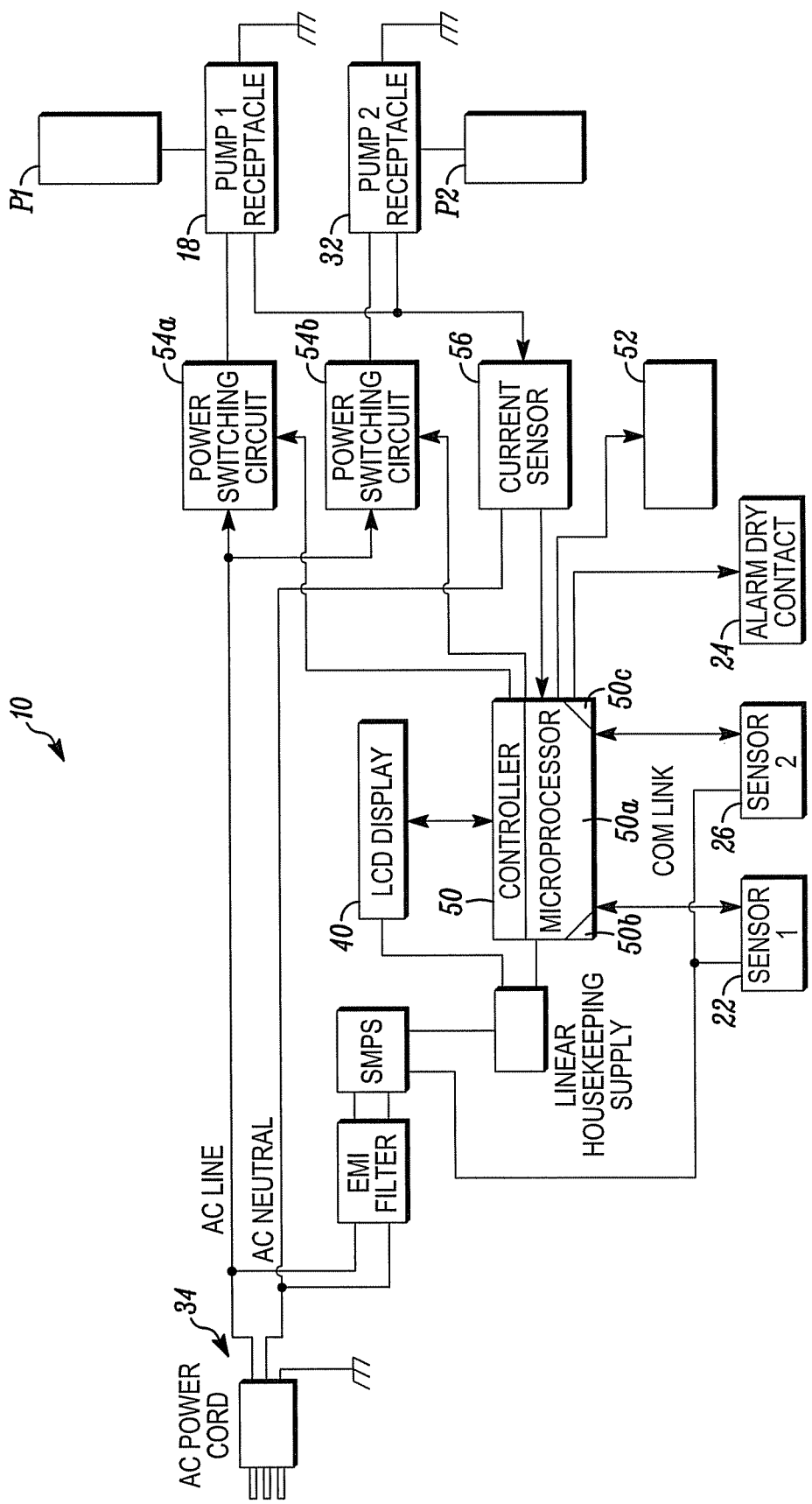
FIG. 2 is a block diagram illustrating additional aspects of the embodiment of FIG. 1.

Referring to FIGS. 1, 2 an embodiment of the invention, a control system 10, can be carried in a housing 12. Housing 12 can support a power on indicator, such as an LED, 14 as well as an alarm indicating indicator 16.

A first pump P1 can be coupled to the system 10 via an AC-type receptacle 18. Housing 12 can also carry a pump 1 running LED indicator 20. A first digital level sensor 22 can be coupled to the housing 12 via a connector. A remote alarm output contact, for example a relay contact 24 can be accessed at a connector on the housing 12.

A second, high level, digital level sensor 26 can be coupled to the housing 12 via a connector. A test/reset pushbutton, for a switch, 28 can also be carried by housing 12. Housing 12 can also carry a pump 2 running LED indicator 30.

A second pump P2 can be coupled to the system 10 via an AC-type connector or receptacle 32. AC power can be input, via a cord, at 34. Switch actuators 36, 38 can be used to decrement or increment a level set point. A liquid crystal display 40 can be carried by housing 12 to provide output messages visually.

A controller 50 can be implemented with a programmable processor 50a, associated executable instructions, software 50b pre-stored on a computer readable medium and interface circuits and storage or memory units 50c. Pumps P1, P2 can be driven by respective switching circuits 54a, 54b. A current sensor 56 makes it possible to determine if one or both pumps are running.

Figure 3:
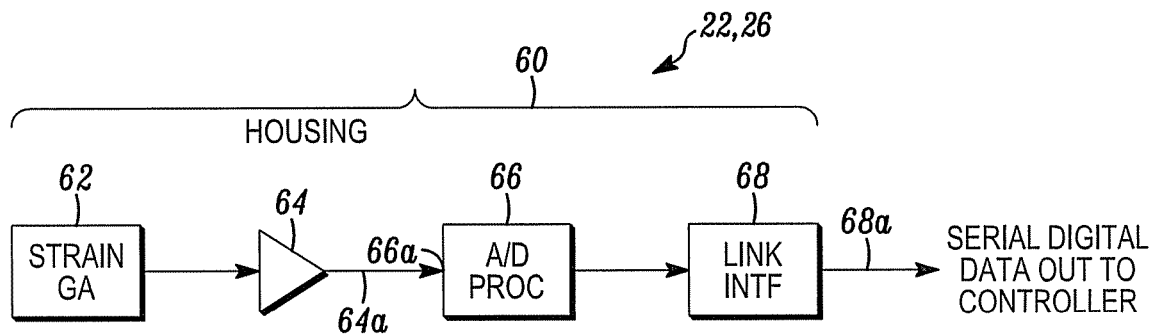
FIG. 3 is a diagram of an exemplary sensor.

FIG. 3 illustrates an exemplary diagram of one of the sensors, such as 22, 26. The sensors, such as 22, 26 can include a sealed housing 60, which would be configured as a float switch. A strain gage, which might be implemented as a bridge, 62 is carried in housing 60 and responsive to external water pressure. Output from the strain gage 62 can be processed, in one or more operational amplifier circuits, such as 64. A processed pressure indicative signal can be coupled on a line 64a to a programmed processor 66 which has an A/D input port 66a. Processed digital signals, representative of sensed pressure can be coupled by processor 66 to link interface circuits 68. In a disclosed embodiment, serial digital output signals on a line 68a can be coupled to controller 50.

Figure 4:
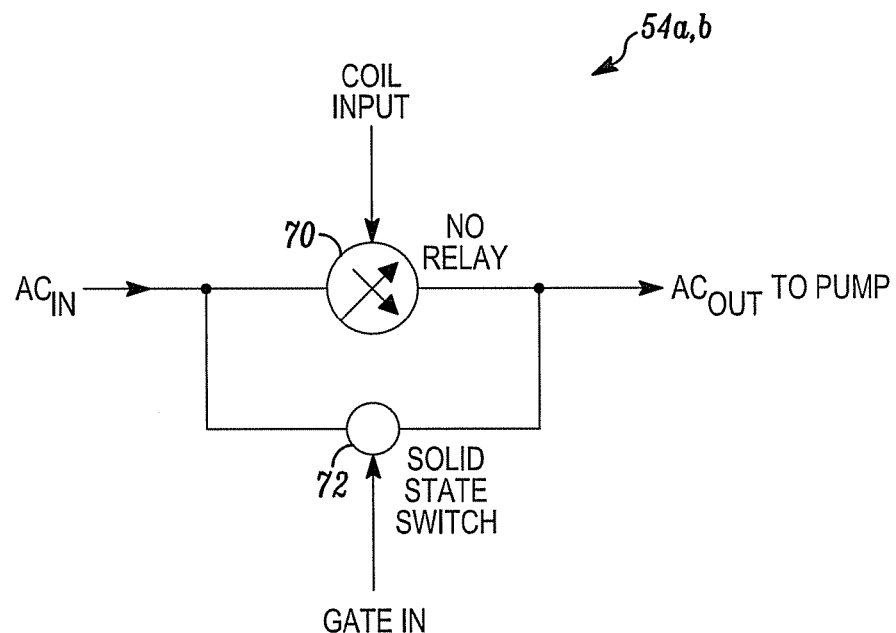
FIG. 4 is a diagram of an exemplary pump switching circuit.

FIG. 4 illustrates a switching configuration usable in the pump switching circuits 54a, 54b. Circuits 54a,b can include a normally open relay 70 with contacts coupled in parallel across a solid state switch 72.

Further, in accordance with the invention, the controller 50 is able to determine whether there is one pump, such as P1, or two pumps P1, P2 connected to it upon initial power up of the unit using current sensor 56. When the controller 50 is initially powered, the host microprocessor 50a executes a setup process. The setup process begins by displaying the product name on the liquid crystal display, or LCD 40. The processor 50a then continues by enabling the P1 switching circuit 54a and taking measurements of the pump 1 receptacle current, via current sensor 56, over a specified sample period.

When the period has expired, the pump 1, P1, switching circuit 54a is deactivated and the same process is repeated for pump 2, P2. When the pump 2 receptacle current sampling period has expired, the host microprocessor 50a determines whether there are one or two pumps connected to the unit 10 by comparing each of the measured current values to a predetermined threshold value. If the measured current of each pump test is greater than or equal to this threshold value, then it is determined that the respective pump is indeed connected to its respective receptacle on the housing 12.

The setup process continues by displaying which pump or pumps are available and storing the information in the processor's flash memory 50c. It then displays whether the unit 10 is functioning as a simplex controller or a duplex controller based on the number of pumps available. Simplex mode operation occurs when only one pump is available upon setup. Similarly, duplex mode operation commences when two pumps are available upon setup.

This setup sequence occurs each time the unit 10 is initially powered up. In the event of a power failure, the Ion Genesis will perform the setup sequence and determine, once again, how many pumps it is controlling, and consequently, what mode to operate in. This feature can be especially useful if one is attempting to add an extra pump or remove an existing pump from the pump control system 10. If one wishes to amend their present pump setup, they can simply press the RESET pushbutton switch 28 located on the front of the unit 10 or sequence the power to the unit by removing and reinstalling the power cord. Either method ensures that the unit 10 will enter the setup mode and establish the proper mode of operation automatically.

Upon completion of the initial setup mode sequence the controller 50 can execute internal diagnostic software routines which target proper LCD operation, proper digital sensor operation, and proper load current operation. Should a problem arise in one or more of these areas, the control circuits 50 dynamically determine a new mode of operation.

If it is determined that no faults have been detected or logged by the error checking algorithms, then Normal Operation Mode is entered. In this mode, the pump controller 50 works by monitoring the water level in the sump environment and comparing that value to the user-adjustable pump turn on level. If the level of water detected is equal to the pump turn on level then pump is activated.

An advantageous feature of the system 10 is the ability of the user to dynamically make adjustments to the pump turn on level. The user can adjust the turn-on height of the pump(s) in half-inch increments by simply pressing either the UP Arrow push button switch 38 or the DOWN Arrow push button switch 36. The flexibility of this design and feature allows the user to tailor their pumping cycles quickly and easily without the necessity of manually adjusting the position of the level sensor. The sump pit cover can remain intact and undisturbed saving time and reducing the effort needed to make the necessary adjustments.

The ability to quickly adjust the pump turn on set point is beneficial to many fluid pumping scenarios. If installed in a typical residential sump pit, which is often tall and narrow, the user can adjust the pump turn on set point to a higher level allowing for fewer pump cycles with a fixed fluid flow rate into the sump pit. Likewise, if installed in a larger diameter sump pit environment where the volume of water is inherently large, the user could adjust the pump turn on height to a lower level ensuring that the level of fluid in the pit remains relatively low as a constant. This may be extremely useful when a low GPM (gallon per minute pump) is used in a large sump pit environment.

When a user changes the pump turn on set point value, the new value is stored in the host microprocessor's flash memory 50c after 3 seconds of remaining unchanged. No values are saved while the user is making adjustments to the pump turn on level. This feature is unique and beneficial as it provides a static and nonvolatile set point should power be lost or removed and subsequently restored to the Ion Genesis. The user does not have to re-adjust the pump turn on level when power is restored after a power failure, as the value has been retained.

In continuing with the normal pump operation mode, when a pump has been energized as described above several key areas of the pump's operations are scrutinized to determine whether the pump is operating properly. During pump operation, the pump current is sampled and processed to ensure it is operating within a predetermined range of current values. Should the measured pump current exceed the maximum current threshold value or fall below the minimum pump current threshold value, a pump current fault is latched within the host microprocessor for subsequent fault handling.

Because the controller 50 has the real-time ability to determine the precise water level in the sump environment, a level trending process, implemented by the processor 50a executing instructions 50b, can be included to determine whether the activated pump is indeed causing the fluid level in the sump to change in a negative direction over time. Under normal operating conditions, if a pump is running properly and the discharge piping is unobstructed, the volume of fluid in the pit is removed and thereby reduced at a rate equal to the GPM of the pump minus the rate of volume of water entering the pit at that instance. In this regard, sensed liquid levels can be stored and compared over a period of time.

By monitoring the rate at which the water level changes, the controller 50 can determine whether a pump is operating at an inadequate or insufficient level. Should it be determined that a pump is not performing adequately, a pump trending fault is latched within the host microprocessor for subsequent fault handling.

If it is determined that none of the above fault scenarios have occurred, then the pump can be disabled when the water level in the sump has reached a predetermined, static, threshold level. This level can be set to 2", but can be altered by changing a static constant in the control software 50b.

One of the advantages of digital based fluid sensing and microprocessor control is the ability to establish process control algorithms for monitoring a plurality of dynamic state variables throughout a system. As described above, the controller 50 is capable of monitoring many system variables including pump current, digital sensor data and communications, and digital sensor internal diagnostics. Additionally, the controller 50 is capable of responding to a variety of fault scenarios should they occur.

In a disclosed, exemplary embodiment, the controller 50 can group the various alarm states into two priority categories. The first category contains standard priority alarms and the second category contains high priority alarms. When an alarm is initially activated, it's priority is determined and a piezo alarm output device 52 is activated.

The rate at which the piezo tone repeats itself it is determined by the priority of the alarm. If the alarm is a standard priority alarm, the piezo alarm tone repeats at a ¼ second rate. If the alarm is a high priority alarm, the piezo tone repeats at a faster ⅛ second rate. This feature allows the user to audibly determine the fault priority status of the controller 50 without the need for visual clarification from the LCD display 40. The rates can be varied.

Fault #1: 5 Minute Timer Run Fault—This fault is set, or latched, when a pump has been running continuously for a duration of 5 minutes. Possible causes for this fault include, but are not limited to, a broken or stalled impeller or an obstruction of the pump's discharge pipe. Should any of the above conditions arise, the controller 50 enters the standard priority alarm mode thereby activating the piezo alarm tone alerting the user to the potential problem. The alarm type is displayed on the LCD display 40 allowing the user to recognize the fault and correct the situation accordingly.

If the system was running in duplex mode at the time the fault occurred, the pump that was running is turned off and the next available pump is turned on to continue the pumping cycle. This fault persists until the pump cycle has been terminated by the digital level sensor.

Fault #2: Pump Failed Fault—This fault is latched when a pump start cycle has been initiated and the pump current falls below a predetermined threshold level. Possible causes for this fault include, but are not limited to, the pump being unplugged from the unit 10 while it was operating, the pump's internal thermal fuse opening, an over-current protection device on the pump opening, or possibly an internal failure of the power switching components within the controller. Should any of the above conditions arise, the controller 50 enters the standard priority alarm mode thereby activating the piezo alarm 52 thereby generating a tone alerting the user to the potential problem.

The alarm type is displayed on the LCD display 40 allowing the user to recognize the fault and correct the situation accordingly. If the system was running in duplex mode at the time the fault occurred, the pump that was running is turned off and the next available pump is turned on to continue the pumping cycle. The Pump Failed Fault also triggers the one of the controller's external relay contacts, such as 24, allowing the fault to be recorded and tended to by the user's home alarm monitoring system, if connected.

Fault #3: Pump Current Detected Fault—This fault is latched when the controller 50 determines that there is current being drawn from one or more of the pump receptacles with none of the power switching devices, such as 54a, 54b, being activated. Possible causes for this fault include, but are not limited to, one or more of the triacs and/or relay contacts being shorted closed in the circuits 54a, 54b. This is a typical failure mode of triac semiconductors if they have been over-stressed due to thermal power dissipation or if their maximum operating voltage has been exceeded. This can also occur with relay contacts if they are switching inductive loads where large voltage transients are allowed to occur.

Should any of the above conditions arise, the controller 50 enters the standard priority alarm mode thereby activating the piezo alarm 52 to generate an alarm tone alerting the user to the potential problem. The alarm type is displayed on the LCD display 40 allowing the user to recognize the fault. Should this fault occur, the system 10 can be evaluated and repaired, as needed.

Fault #4: Pump Trending Fault—This fault is latched when the controller 50 determines that discharge rate of the active pump has fallen below a predetermined value. Possible causes for this fault include, but are not limited to, excessive water flow into the sump environment at or exceeding the discharge capacity of the pump, a broken or stalled impeller, or an obstruction of the pump's discharge pipe. Should any of the above conditions arise, the controller 50 enters the standard priority alarm mode thereby activating the piezo alarm tone alerting the user to the potential problem.

The alarm type is displayed on the LCD display 40 allowing the user to recognize the fault and correct the situation accordingly. If the system was running in duplex mode at the time the fault occurred, the pump that was running is turned off and the next available pump is turned on to continue the pumping cycle. This fault persists until the pump cycle has been terminated by the digital level sensor, such as 22.

Fault #5: Digital Sensor Fault—This fault is latched when either of the following conditions arise: If there are 8 consecutive float communication failures of the controller 50 and either of the digital level sensors 22, 26 then a Digital Sensor Fault is latched. Possible causes for this fault include, but are not limited to, accidentally unplugging one or more of the sensors from the Ion Genesis controller, a loose connection between one or more the sensors 22, 26 and the controller 50, a break in one or more of the sensor's conductors, or an internal error within the digital level sensor. Should this alarm occur, the controller 50 enters a high priority alarm mode thereby activating the piezo alarm tone alerting the user to the potential problem. The alarm type is displayed on the LCD display 40 allowing the user to recognize the fault. This fault persists until the communication between the controller 50 and the respective digital level sensor 22, 26 is re-established.

Alternately, if either of the digital level sensor's processors experience an internal fault condition then a Digital Sensor Fault is latched. Possible causes for this fault include, but are not limited to, over temperature of the digital sensor, improper operating voltage of the digital sensor, or invalid CRC checksum error within the received communication packet. Should this alarm occur, the controller 50 enters the high priority alarm mode thereby activating the piezo alarm 52 which generates an alarm tone alerting the user to the potential problem. The alarm type is displayed on the LCD display 40 allowing the user to recognize the fault. This fault persists until all faults are cleared within both of the digital level sensors 22, 26.

Fault #6: High Water Sensor Called For Fault—This fault is latched when the high water sensor detects the presence of water approximately 2 inches above it's calibrated 0 inch set point. Possible causes for this fault include, but are not limited to, excessive water flow into the sump environment at or exceeding the discharge capacity of the pump, a broken or stalled impeller, or an obstruction of the pump's discharge pipe. Should any of the above conditions arise, the controller 50 enters the high priority alarm mode thereby activating the piezo alarm tone alerting the user to the potential problem.

The alarm type is displayed on the LCD display 40 allowing the user to recognize the fault and correct the situation accordingly. If the system was running in duplex mode at the time the fault occurred, the pump that was running is turned off and the next available pump is turned on to continue the pumping cycle. This fault persists until the water level falls to approximately 1.5 inches above the high water sensor's calibrated 0 inch set point.

Fault #7: High Water Sensor Mode—This fault is latched when either of the following conditions arise: A: If there are 8 consecutive float communication failures between the controller 50 and the respective digital level sensor 22, 26. Possible causes for this fault include, but are not limited to, accidentally unplugging the digital level sensor 22, 26 from the controller 50, a loose connection between the digital level sensors, such as 22, 26 and the controller 50, a break in one or more of the sensor's conductors, or an internal error within a digital level sensor 22, 267. Should this alarm occur, the controller 50 can enter the high priority alarm mode thereby activating the piezo alarm tone alerting the user to the potential problem. The alarm type is displayed on the LCD display 40 allowing the user to recognize the fault. This fault also causes the controller 50 to enter and operate in a separate control mode, allowing the pump(s) P1, P2 to be cycled by the alarm float only. This fault, as well as control mode, persists until the communication between the controller 50 and the respective digital level sensor 22, 26 is re-established.

Alternately, this fault is detected if the measured high water sensor value is greater than or equal to the measured digital sensor value plus one inch. Possible causes for this fault include, but are not limited to, the high alarm sensor being installed below the digital level sensor. Should this alarm occur, the controller 50 enters the high priority alarm mode thereby activating the piezo alarm tone alerting the user to the potential problem. The alarm type is displayed on the LCD display 40 allowing the user to recognize the fault.

This fault also causes the controller 50 to enter and operate in a separate control mode, allowing the pump(s) to be cycled by the alarm float 26 only. This fault, as well as the respective control mode, persists until the measured value from the high water sensor is less than the measured value from the digital control sensor.

Embodiments of the invention exhibit a variety of advantages including:
1) A microprocessor controlled pump controller utilizing digital water level sensors.
2) Ability to dynamically adjust the turn on set point of the pump(s) with user actuated push button switches.
3) Eliminates the necessity to enter the sump pit to adjust the float height in order to change the turn on point of the pump(s).
4) Ability to monitor the exact height of the fluid level in the sump pit to within 0.1 inches accuracy.

5) Ability to measure pump current while pump is running and determine whether the pump is operating correctly.
6) Ability to monitor fluid level trending over a specified period to determine whether a pump is operating correctly.
7) Ability to switch power to the pumps using a combination of solid state switch components and mechanical relay components to prolong switch life and increase switching reliably.
8) Ability to determine internal component failures in the power switching component using current sensing methods together with software control algorithms.
9) Ability to determine whether digital level sensors are working properly through the creation and use of dedicated software control programs.
10) Ability to maintain sequenced duplex pump control operation with only one operating digital level sensor.
11) Ability to notify the user of the various alarm conditions through the means of a liquid crystal display.
12) Ability to notify the user of various alarm conditions through the use of the piezo tone generating alarm unit.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A pump control unit comprising:
a housing;
control circuits;
at least one pressure sensor, carried in the housing at a location irrespective of a pump turn-on level, the sensor measures ambient fluid pressure and emits a digital representation of the ambient fluid pressure with the sensor coupled to the control circuits;
at least one manually operable fluid level adjusting element coupled to the control circuits; and
a pump switching circuit coupled to the control circuits, wherein, responsive to user input, the element adjusts a pump turn-on fluid level whose pressure is being sensed by the sensor, and
wherein the pump switching circuit includes a solid state switching device in parallel with a mechanical switch.

2. A unit as in claim 1 which includes a second pressure sensor, where the second sensor is carried in the housing, the sensor measures ambient fluid pressure and emits a digital representation of the ambient fluid pressure with the second sensor coupled to the control circuits.

3. A unit as in claim 2 where the pump switching circuit is part of a serial digital data link.

4. A unit as in claim 3 further comprising a second pump switching circuit coupled to the control circuits, wherein the second pump switching circuit includes a second solid state switching device in parallel with a second mechanical switch.

5. A unit as in claim 1 which includes circuits to detect a number of pumps coupled thereto.

6. A unit as in claim 5 with a display and circuits to present an indication of the attached number of pumps.

7. A unit as in claim 5 which include circuits to sample pump operating current to establish the presence of an abnormal current train.

8. A unit as in claim 5 which include circuits to sample fluid levels over time to detect if fluid level is declining in response to energizing a respective pump.

9. A unit as in claim 5 which includes circuits to keep track of pump run time and in response thereto, to establish the presence of a run-time fault.

10. A unit as in claim 5 which include circuits to detect if pump current is below a predetermined threshold and responsive thereto, to indicate a fault.

11. A unit as in claim 5 which includes circuits to detect pump current in the presence of a non-pumping condition and, responsive thereto, to indicate a fault.

12. A unit as in claim 5 which includes circuits to detect a sensor failure and responsive thereto, to indicate a fault.

13. A unit as in claim 5 which includes circuits to detect a high water condition and responsive thereto, to indicate a fault.

14. A unit as in claim 5 which include at least one of a visual output device or an audible output device to indicate a fault condition.

15. A sensor comprising:
a housing;
a pressure responsive circuit carried in the housing at a location irrespective of a pump turn-on level;
control circuits, coupled to the pressure responsive circuit, the control circuits convert an analog pressure responsive signal to a corresponding digital signal; and
output circuits, coupled to the control circuits to emit a serial output representation of sensed pressure,
wherein the serial output representation of sensed pressure can provide an indication of sensor failure.

16. A sensor as in claim 15 where the pressure responsive circuit comprises a bridge circuit.

17. A pump control unit comprising:
a plurality of water pressure sensors, each sensor carried in a housing at a location irrespective of a pump turn-on level, each sensor includes a water resistant housing and a pressure responsive circuit;
control circuits, coupled to the pressure responsive circuit, the control circuits convert an analog pressure responsive signal to a corresponding digital signal;
output circuits, coupled to the control circuits to emit a serial output representation of sensed pressure;
a control element, coupled to the sensors, and at least one manually operable fluid level adjusting member coupled to the control element with the member adjusting a pump turn-on fluid level whose pressure is being sensed by one of the sensors; and
first and second pump motor switching circuits, with each pump motor switching circuit including a mechanical switch coupled in parallel with a solid state switching device.

18. A control unit as in claim 17 which includes a visual, two dimensional display coupled to the control element and where the control element includes a programmed processor.

19. A control unit as in claim 18 which includes executable instructions stored on a computer readable medium, executable by the processor to detect one of a plurality of predetermined faults and to generate a visual indicator thereof.

* * * * *